United States Patent [19]
Groves et al.

[11] Patent Number: 5,778,735
[45] Date of Patent: Jul. 14, 1998

[54] INTERLAYER TOUGHENING OF FIBER COMPOSITE FLYWHEEL ROTORS

[75] Inventors: Scott E. Groves, Brentwood; Steven J. Deteresa, Livermore, both of Calif.

[73] Assignee: Regents of the University of California, Oakland, Calif.

[21] Appl. No.: 649,390

[22] Filed: May 17, 1996

[51] Int. Cl.⁶ .................................................. G05G 1/00
[52] U.S. Cl. .................................................. 74/572
[58] Field of Search .................................. 74/572–574

[56] References Cited

U.S. PATENT DOCUMENTS

| | | | |
|---|---|---|---|
| 2,857,094 | 10/1958 | Erwin | 230/134 |
| 3,279,967 | 10/1966 | Martin et al. | 156/172 |
| 3,403,844 | 10/1968 | Stoffer | 230/134 |
| 3,505,717 | 4/1970 | Palfreyman | 29/156.8 |
| 3,613,627 | 10/1971 | Boeing | 114/235 F |
| 3,675,294 | 7/1972 | Palfreyman et al. | 23/156.8 R |
| 3,718,087 | 2/1973 | Sokolov | 101/147 |
| 4,679,485 | 7/1987 | Nelson et al. | 89/36.02 |
| 5,346,570 | 9/1994 | Warden et al. | 156/191 |
| 5,614,777 | 3/1997 | Bitterly et al. | 310/74 |

*Primary Examiner*—Vinh T. Luong
*Attorney, Agent, or Firm*—Henry P. Sartorio; L. E. Carnahan

[57] ABSTRACT

An interlayer toughening mechanism to mitigate the growth of damage in fiber composite flywheel rotors for long application. The interlayer toughening mechanism may comprise one or more tough layers composed of high-elongation fibers, high-strength fibers arranged in a woven pattern at a range from 0° to 90° to the rotor axis and bound by a ductile matrix material which adheres to and is compatible with the materials used for the bulk of the rotor. The number and spacing of the tough interlayers is a function of the design requirements and expected lifetime of the rotor. The mechanism has particular application in uninterruptable power supplies, electrical power grid reservoirs, and compulsators for electric guns, as well as electromechanical batteries for vehicles.

16 Claims, 1 Drawing Sheet

INTERLAYER TOUGHENING OF FIBER COMPOSITE FLYWHEEL ROTORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to flywheels, particularly to fiber composite flywheel rotors, and more particularly to an interlayer toughening mechanism to mitigate the growth of damage in fiber composite flywheel rotors for long-term applications.

Flywheels using various types of rotors have found numerous different applications. With the advent of fiber composite rotors for flywheel systems, efforts have been directed to the development of high power and high energy density fiber composite flywheel systems.

An obstacle to the successful design of such high power- and energy-density fiber composite flywheel systems is the poor transverse properties of these materials. To date, all flywheels having a rim or cylindrical geometry have been produced using circumferentially wrapped fibers only. While this fiber orientation maximizes the hoop strength and therefore the performance of the flywheel, it also yields a structure which is extremely sensitive to catastrophic failure due to propagation cracks. High performance flywheels have been spun to failure with impressive results, but the issue of durability over the long lifetimes most devices are required to function has been virtually ignored.

The present invention solves this shortcoming by incorporating one or a series of tough interlayers between circumferentially wrapped fiber in order to provide a barrier to damage growth and layer separation. The addition of this system of tough interlayers reduces the maximum energy storage capacity, but the benefits to component lifetime outweigh these losses. The particular spacing and density of the interlayers will be determined by the design requirements for the various flywheel systems.

SUMMARY OF THE INVENTION

It is an object of the present invention to provide interlayer toughening of fiber composite flywheel rotors.

A further object of the invention is to provide means to mitigate the growth of damage in fiber composite flywheel rotors.

A further object of the invention is to provide an interlayer toughening mechanism for fiber composite flywheel rotors.

Another object of the invention is to provide an interlayer structure for fiber composite rotors composed of one or a series of tough interlayers between circumferentially wrapped fiber layers.

Another object of the invention is to provide interlayers for fiber composite rotors composed of high-elongation, high-strength fibers arranged in a woven pattern an angle $\pm\theta$, where $\theta$ is in the range of 0° to 90° to the rotor axis and bound by a ductile matrix material which adheres to and is compatible with the materials used for the bulk of the rotor.

Other objects and advantages of the present invention will become apparent from the following description and accompanying drawings. The invention basically involves interlayer toughening of fiber composite flywheel rotors. The interlayer toughening mechanism mitigates the growth of damage in fiber composite rotors. The interlayers are composed of high-elongation, high-strength fibers arranged in a woven pattern at an angle from 0° to 90° with respect to the rotor axis and are bound by a ductile matrix material which adheres to and is compatible with the materials used for the bulk of the rotor. The number and spacing of these tough interlayers is a function of the design requirements and expected lifetime of the rotor.

The interlayer toughening of fiber composite rotors as provided by the present invention greatly increases the use potential in systems such as flywheel-based energy storage or conversion devices such as uninterruptable power supplies, electrical power grid reservoirs and compulsators for electric guns, as well as for electromechanical batteries for transportation, and light-weight power sources.

BRIEF DESCRIPTION OF THE DRAWINGS

The accompanying drawings, which are incorporated into and form a part of the disclosure, illustrate an embodiment of an interlayer toughener of the invention and, together with the description, serve to explain the principles of the invention.

DETAILED DESCRIPTION OF THE INVENTION

The invention involves a flywheel rotor having tough interlayer structure comprised of high-elongation, high-strength fibers woven into an angled pattern oriented within the range of 0° to 90° with respect to the axis of the axis of the rotor. The interlayer functions to mitigate the growth of damage in fiber composite flywheels for long-term applications. The woven pattern of fibers is bound by a ductile matrix material which adheres to and is compatible with the materials used for the bulk of the rotor. The number and spacing of the tough interlayers is a function of the design requirements and the expected lifetime of the rotor. The high-elongation, high-strength fibers may be composed of glass, polyethylene, and aramid, for example. The compatibility and adhesion of the ductile matrix material must be maintained over the life of the rotor. The volume percentage of fiber within the structure should be about 55–65%. The interlayer can be fabricated using standard filament-winding or fiber placement techniques.

The woven fiber structure is able to elongate in the circumferential direction to match the rotor growth during spinning. It is also a tough, damage-tolerant and fatigue-resistant structure when fabricated using high-strength fibers and ductile matrix material. The fibers are woven into a $\pm\theta$ pattern, wherein the angle $\theta$ is from the range of 0° to 90° (45° for example) with respect to the rotor axis.

Figure 2:
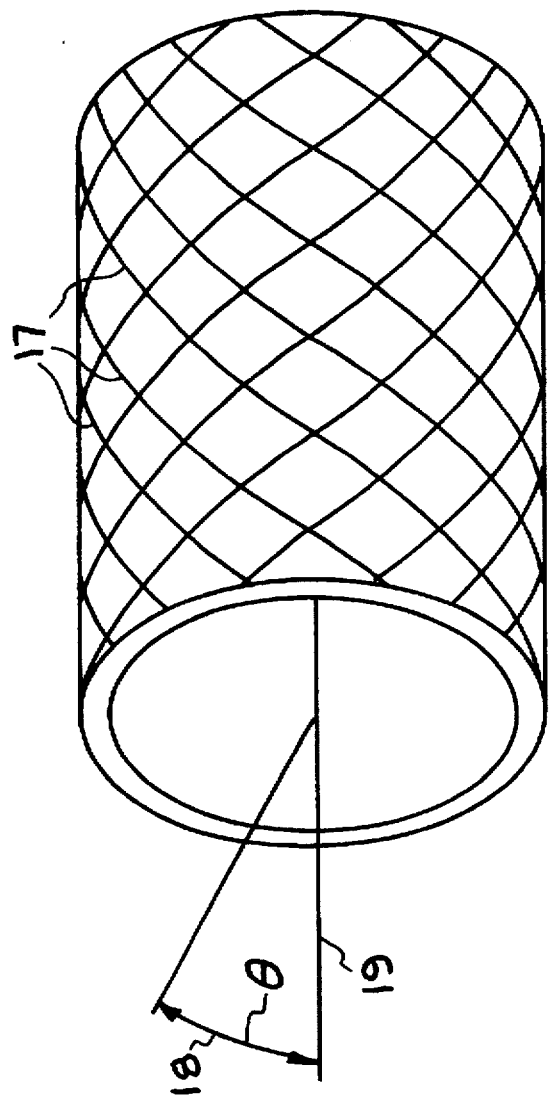
FIG. 2 is an enlarged perspective side view of an embodiment of an interlayer of the present invention.
Figure 1:
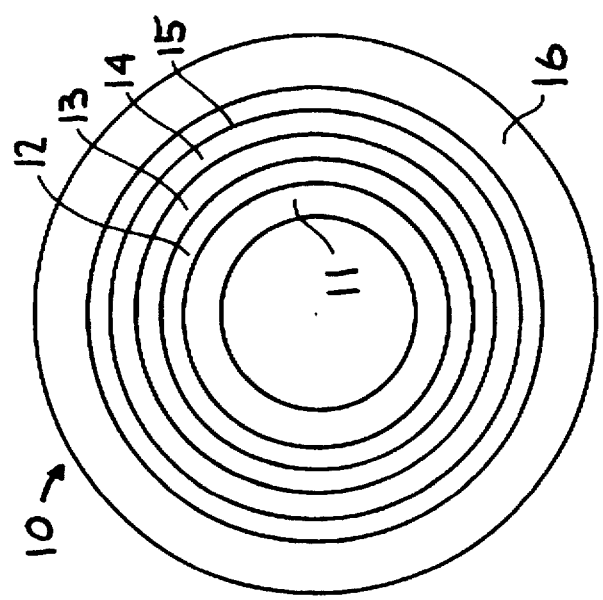
FIG. 1 is an end view of a fiber composite rotor incorporating toughening interlayers made in accordance with the invention.

Referring now to the drawings, FIG. 1 is an end view of a fiber composite flywheel rotor utilizing four interlayers, while FIG. 2 is an enlarged side view of an interlayer of FIG. 1. As shown the rotor, generally indicated at 10 is composed of an inner layer 11, a first toughened interlayer 12, a second toughened interlayer 13, a third toughened interlayer 14, a fourth toughened interlayer 15, and an outer layer 16. As seen in FIG. 2, the toughened interlayer (12–15) is composed of high-strength, high-elongation fibers 17 cross-woven into a $\pm\theta$ pattern, indicated at 18, wherein the angle $\theta$ is about 45° with respect to the interlayer axis 19.

By way of example, the fibers 17 may be composed of glass, carbon, polyethylene, and aramid, having a diameter of 5 to 10 microns, with the interlayers 12–15 having a thickness range of 0.01 to 0.1 inch. The angle θ may range from 0° to 90° with respect to axis 19. The woven fibers 17 are bonded by a ductile matrix material such as a toughened epoxy system, thermoset (urethane), or thermoplastic material. The volume percentage of fiber within an interlayer should be 55–65%. The rotor 10 of FIG. 1 may be produced using conventional filament-winding techniques.

It has thus been shown that the present invention provides interlayer toughening for fiber composite flywheel rotors. The advantage of the interlayer toughener is in mitigating premature catastrophic failure of the composite rotor which could occur due to the unchecked growth of fabrication- or service-generated flaws.

While a specific embodiment has been illustrated, and specific materials and parameters set forth to provide an understanding of the invention, such are not intended to be limiting. Modifications and changes may become apparent to those skilled in the art, and it is intended that the invention be limited only by the scope of the appended claims.

The invention claimed is:

1. In a fiber composite rotor, the improvement comprising:

at least one toughening interlayer, said interlayer being composed of fibers woven at an angle with respect to an axis of the rotor and bonded by a ductile matrix material.

2. The improvement of claim 1, wherein said fibers are woven at an angle of about 0° to 90° to said axis of the rotor.

3. The improvement of claim 2, wherein said angle is about 45°.

4. The improvement of claim 1, wherein said fibers are composed of material selected from the group of glass, carbon, polyethylene, and aramid.

5. The improvement of claim 1, wherein said fibers in said interlayer being about 55–65 volume percentage of said interlayer.

6. The improvement of claim 1, wherein said ductile matrix material is selected from the group consisting of toughened epoxies, thermosets, and thermoplastics.

7. An improved fiber composite rotor including means for mitigating premature catastrophic failure of a said rotor due to growth of fabrication- or service-generated flaws.

8. The improved fiber composite rotor of claim 7, wherein said means comprises at least one interlayer of fibers woven at an angle with respect to an axis of said rotor.

9. The improved fiber composite rotor of claim 8, wherein said interlayer is composed of fibers selected from the group consisting of glass, carbon, polyethylene, and aramid.

10. The improved fiber composite rotor of claim 8, wherein said angle is about 45°.

11. The improved fiber composite rotor of claim 9, wherein said fibers are bonded in a material selected from the group consisting of epoxies, thermosets, and thermoplastics.

12. The improved fiber composite rotor of claim 8, wherein said interlayer is composed of fibers having a volume percentage of 55–65%.

13. Means for toughening a fiber composite flywheel rotor for preventing catastrophic failure of said flywheel rotor, comprising:

at least one interlayer of fiber woven at an angle with respect to said flywheel rotor and bonded by a ductile matrix material, wherein the volume percentage of said fiber is about 55–65%.

14. The means of claim 13, wherein said angle is in the range of 0° to 90°.

15. The means of claim 13 wherein said fiber is composed of material selected from the group consisting of glass, carbon, polyethylene, and aramid.

16. The means of claim 13, wherein said ductile matrix material is selected from the group consisting of toughened epoxies, thermosets, and thermoplastics.

* * * * *